United States Patent
Tripathi et al.

(10) Patent No.: US 7,984,123 B2
(45) Date of Patent: Jul. 19, 2011

(54) METHOD AND SYSTEM FOR RECONFIGURING A VIRTUAL NETWORK PATH

(75) Inventors: Sunay Tripathi, San Jose, CA (US); Erik Nordmark, Mountain View, CA (US); Nicolas G. Droux, Rio Rancho, NM (US)

(73) Assignee: Oracle America, Inc., Redwood City, CA (US)

( * ) Notice: Subject to any disclaimer, the term of this patent is extended or adjusted under 35 U.S.C. 154(b) by 495 days.

(21) Appl. No.: 11/953,837

(22) Filed: Dec. 10, 2007

(65) Prior Publication Data

US 2009/0150527 A1    Jun. 11, 2009

(51) Int. Cl.
*G06F 15/177* (2006.01)
(52) U.S. Cl. ........ 709/221; 709/220; 709/222; 709/227; 709/230
(58) Field of Classification Search .......... 709/220–222, 709/227
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,269,401 B1 | 7/2001 | Fletcher et al. | |
| 6,477,643 B1 | 11/2002 | Vorbach et al. | |
| 6,594,775 B1 | 7/2003 | Fair | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,771,595 B1 | 8/2004 | Gilbert et al. | |
| 6,831,893 B1 | 12/2004 | Nun et al. | |
| 6,859,841 B2 | 2/2005 | Narad et al. | |
| 6,944,168 B2 | 9/2005 | Paatela et al. | |
| 6,985,937 B1 | 1/2006 | Keshav et al. | |
| 7,046,665 B1 | 5/2006 | Walrand et al. | |
| 7,111,303 B2 * | 9/2006 | Macchiano et al. | 719/313 |
| 7,146,431 B2 | 12/2006 | Hipp et al. | |

(Continued)

FOREIGN PATENT DOCUMENTS

WO    2005057318 A2    6/2005

(Continued)

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

(Continued)

*Primary Examiner* — Yves Dalencourt
(74) *Attorney, Agent, or Firm* — Osha • Liang LLP

(57) ABSTRACT

A method, system, and computer readable medium for reconfiguring a virtual network path. A virtual switching table associated with virtual network interface cards (VNICs) is populated and used to implement the virtual network path. The virtual network path includes a first virtual wire between a first VNIC located in a first computer and a second VNIC located in a second computer. A first network packet and a second network packet are placed in a receive buffer associated with the second VNIC. The first network packet is transmitted to the second VNIC using the virtual switching table. The second VNIC is migrated from the second computer to a third computer. The virtual switching table is updated based on migrating the second VNIC. The second network packet is transmitted to the second VNIC in the third computer using the virtual switching table.

20 Claims, 12 Drawing Sheets

U.S. PATENT DOCUMENTS

| | | |
|---|---|---|
| 7,177,311 B1 | 2/2007 | Hussain et al. |
| 7,200,704 B2 | 4/2007 | Njoku et al. |
| 7,260,102 B2 | 8/2007 | Mehrvar et al. |
| 7,313,142 B2 | 12/2007 | Matsuo et al. |
| 7,450,498 B2 | 11/2008 | Golia et al. |
| 7,502,884 B1 | 3/2009 | Shah et al. |
| 7,561,531 B2 | 7/2009 | Lewites et al. |
| 7,620,955 B1 | 11/2009 | Nelson |
| 7,633,955 B1 | 12/2009 | Saraiya et al. |
| 7,688,838 B1 | 3/2010 | Aloni et al. |
| 7,694,298 B2 | 4/2010 | Goud et al. |
| 7,730,486 B2 | 6/2010 | Herington |
| 2002/0052972 A1 | 5/2002 | Yim |
| 2002/0080721 A1 | 6/2002 | Tobagi et al. |
| 2003/0037154 A1 | 2/2003 | Poggio et al. |
| 2003/0120772 A1 | 6/2003 | Husain et al. |
| 2004/0015966 A1 | 1/2004 | MacChiano et al. |
| 2004/0170127 A1 | 9/2004 | Tanaka |
| 2004/0199808 A1 | 10/2004 | Freimuth et al. |
| 2004/0202182 A1 | 10/2004 | Lund et al. |
| 2004/0210623 A1 | 10/2004 | Hydrie et al. |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2005/0182853 A1 | 8/2005 | Lewites et al. |
| 2005/0251802 A1 | 11/2005 | Bozek et al. |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0092928 A1 | 5/2006 | Pike et al. |
| 2006/0174324 A1 | 8/2006 | Zur et al. |
| 2006/0206300 A1 | 9/2006 | Garg et al. |
| 2006/0206602 A1 | 9/2006 | Hunter et al. |
| 2006/0233168 A1 | 10/2006 | Lewites et al. |
| 2006/0236063 A1 | 10/2006 | Hausauer et al. |
| 2006/0253619 A1 | 11/2006 | Torudbakken et al. |
| 2007/0047536 A1 | 3/2007 | Scherer et al. |
| 2007/0078988 A1 | 4/2007 | Miloushev et al. |
| 2007/0083723 A1 | 4/2007 | Dey et al. |
| 2007/0101323 A1 | 5/2007 | Foley et al. |
| 2007/0244937 A1 | 10/2007 | Flynn et al. |
| 2007/0244972 A1 | 10/2007 | Fan |
| 2008/0002683 A1 | 1/2008 | Droux et al. |
| 2008/0005748 A1 | 1/2008 | Mathew et al. |
| 2008/0019365 A1 | 1/2008 | Tripathi et al. |
| 2008/0022016 A1 | 1/2008 | Tripathi et al. |
| 2008/0043765 A1 | 2/2008 | Belgaied et al. |
| 2008/0144635 A1 | 6/2008 | Carollo et al. |
| 2008/0171550 A1 | 7/2008 | Zhao |
| 2008/0192648 A1 | 8/2008 | Galles |
| 2008/0225875 A1 | 9/2008 | Wray et al. |
| 2008/0239945 A1 | 10/2008 | Gregg |
| 2008/0253379 A1 | 10/2008 | Sasagawa |
| 2008/0270599 A1 | 10/2008 | Tamir et al. |
| 2009/0006593 A1 | 1/2009 | Cortes |
| 2009/0125752 A1 | 5/2009 | Chan et al. |
| 2010/0046531 A1 | 2/2010 | Louati et al. |

FOREIGN PATENT DOCUMENTS

| | | |
|---|---|---|
| WO | 2008093174 A1 | 8/2008 |

OTHER PUBLICATIONS

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Dovrolis, C., Thayer, B., Ramanathan, P.: "HIP: Hybrid Interrupt—Polling for the Network Interface", ACM SIGOPS Operating Systems Review, vol. 35, Iss. 4, Oct. 2001 (11 Pages).

International Preliminary Report on Patentability issued in PCT/US2009/035405, Dated Sep. 10, 2010. (9 Pages).

International Search Report dated Aug. 19, 2009 (3 pages).

Goldenberg, D. et al.; "Zero Copy Sockets Direct Protocol over InfiniBand—Preliminary Implementation and Performance Analysis"; Proceedings of the 13th Symposium on High Performance Interconnects; Piscataway, NJ; Aug. 17-19, 2005; pp. 128-137 (10 pages).

"I/O Virtualization Using Mellanox InfiniBand And Channel I/O Virtualization (CIOV) Technology"; XP-002541674; Jan. 1, 2007; Retrieved from the Internet: <http://www.mellanox.com/pdf/whitepapers/WP_Virtualize_with_IB.pdf>; pp. 1-16 (16 pages).

"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>; pp. 1-2 (2 pages).

Wheeler, B.; "10 Gigabit Ethernet In Servers: Benefits and Challenges"; XP-002541745; Jan. 1, 2005; Retrieved from the Internet: <http://www.hp.com/products1/serverconnectivity/adapters/ethernet/10gbe/infolibrary110GbE_White_Paper.pdf> (8 pages).

"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).

International Search Report from PCT/US20091048594 dated Sep. 7, 2009 (4 pages).

Written Opinion from PCT/US2009/048594 dated Sep. 7, 2009 (1 page).

Popuri, S., OpenSolaris Virtualization Technologies, Feb. 23, 2007, Retrieved from the Internet,<hub.opensolaris. org/bin/view/Community+Group+advocacy/techdays%2Darchive%2D06%2D07>, 2 pages.

Kumar, R., ASI and PCI Express: Complementary Solutions, Dec. 1, 2004, RTC Magazine, Retrieved from the Internet <rtcmagazine.com/articles/view/100274>, (5 pages).

Martinez, R., Alfaro, F.J., and Sanchez, J.L., Providing Quality of Service Over Advanced Switching, Jan. 1, 2006, IEEE, Retrieved from the Internet, <ieeexplore.ieee.org/xpls/abs_all.jsp?arnumber=1655667&tag=1>, 10 pages.

Apani, Brave New World, Feb. 1, 2007, iSmile, Retrieved from the Internet, <isimile.com/PDFs/Apani_Segmentation_WP.pdf>, 8 pages.

Trapeze, Trapeze Overview, Jan. 1, 1998, USENIX, Retrieved from the Internet, <usenix.org/publications/library/proceedings/usenix98/full_papers/anderson/anderson_html/node4.html>, 2 pages.

Office Action in United States Patent and Trademark Office for U.S. Appl. No. 11/953,829, Mailed Aug. 4, 2010 (30 Pages).

Office Action in United States Patent and Trademark Office for U.S. Appl. No. 11/953,839, Mailed Aug. 19, 2010 (30 Pages.)

Office Action in United States Patent and Trademark Office for U.S. Appl. No. 12/040,165, Mailed Feb. 8, 2010 (40 Pages).

Notice of Allowance in United States Patent and Trademark Office for U.S. Appl. No. 12/040,165, Mailed Oct. 29, 2010 (18 Pages).

Office Action in United States Patent and Trademark Office for U.S. Appl. No. 12/040,101, Mailed May 6, 2010 (39 Pages).

Office Action in United States Patent and Trademark Office for U.S. Appl. No. 11/953,842, Mailed Apr. 30, 2010 (39 Pages).

Final Office Action in United States Patent and Trademark Office for U.S. Appl. No. 11/953,842, Mailed Oct. 15, 2010 (32 Pages).

Office Action in United States Patent and Trademark Office for U.S. Appl. No. 12/040,105, Mailed Nov. 20, 2009 (93 Pages).

Final Office Action in United States Patent and Trademark Office for U.S. Appl. No. 12/040,105, Mailed May 26, 2010 (26 Pages).
Notice of Allowance in United States Patent and Trademark Office for U.S. Appl. No. 12/040,105, Mailed Oct. 5, 2010 (27 Pages).
Office Action in United States Patent and Trademark Office for U.S. Appl. No. 11/953,843, Mailed May 3, 2010 (169 Pages).
Final Office Action in United States Patent and Trademark Office for U.S. Appl. No. 12/040,101, Mailed Dec. 13, 2010 (25 pages).
Final Office Action in United States Patent and Trademark Office for U.S. Appl. No. 11/953,843, Mailed Oct. 15, 2010 (33 Pages).
Office Action in United States Patent and Trademark Office for U.S. Appl. No. 12/053,666, Mailed Dec. 10, 2009 (36 Pages).
Final Office Action in United States Patent and Trademark Office for U.S. Appl. No. 12/053,666, Mailed Jun. 11, 2010 (27 Pages).
Notice of Allowance in United States Patent and Trademark Office for U.S. Appl. No. 12/053,666, Mailed Oct. 7, 2010 (15 Pages).
Office Action in United States Patent and Trademark Office for U.S. Appl. No. 12/053,676, Mailed Dec. 9, 2009 (41 Pages).
Notice of Allowance in United States Patent and Trademark Office for U.S Appl. No. 12/053,676, Mailed Jul. 15, 2010 (20 Pages).
Office Action in United States Patent and Trademark Office for U.S. Appl. No. 11/953,843, Mailed May 3, 2010 (169 pages).

* cited by examiner

METHOD AND SYSTEM FOR RECONFIGURING A VIRTUAL NETWORK PATH

CROSS-REFERENCE TO RELATED APPLICATIONS

The present application contains subject matter that may be related to the subject matter in the following U.S. applications filed on Dec. 10, 2007, and assigned to the assignee of the present application: "Method and System for Creating a Virtual Network Path" with U.S. application Ser. No. 11/953,829; "Method and System for Controlling Network Traffic In a Blade" with U.S. application Ser. No. 11/953,832; "Method and System for Enforcing Resource Constraints For Virtual Machines Across Migration" with U.S. application Ser. No. 11/953,839; "Method and System for Monitoring Virtual Wires" with U.S. application Ser. No. 11/953,842; and "Method and System for Scaling Applications On A Blade Chassis" with U.S. application Ser. No. 11/953,843.

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method and system for creating and managing a virtual network path between virtual machines in a network, wherein the virtual machines are located on different computers connected to a chassis interconnect.

In general, in one aspect, the invention relates to a method for reconfiguring a virtual network path. The method includes populating a virtual switching table associated with a plurality of virtual network interface cards (VNICs), wherein the plurality of VNICs is associated with a plurality of virtual machines, wherein the plurality of virtual machines is located in a plurality of computers communicatively coupled with each other via a chassis interconnect, and wherein the plurality of computers shares a physical network interface, implementing the virtual network path using the virtual switching table, wherein the virtual network path comprises a first virtual wire between a first VNIC selected from the plurality of VNICs and a second VNIC selected from the plurality of VNICs, wherein the first VNIC is associated with a first virtual machine selected from the plurality of virtual machines and located in a first computer selected from the plurality of computers, and wherein the second VNIC is associated with a second virtual machine selected from the plurality of virtual machines and located in a second computer selected from the plurality of computers, placing a first network packet and a second network packet in a receive buffer associated with the second VNIC, transmitting the first network packet to the second VNIC in the second computer using the virtual switching table, migrating the second VNIC and the second virtual machine from the second computer to a third computer selected from the plurality of computers, updating the virtual switching table based on migrating the second VNIC, and transmitting the second network packet to the second VNIC in the third computer using the virtual switching table, wherein transmitting the first network packet is performed before migrating the second VNIC and the second virtual machine, and wherein transmitting the second network packet is performed after migrating the second VNIC and the second virtual machine.

In general, in one aspect, the invention relates to a system. The system includes a chassis interconnect, a physical network interface, a plurality of blades communicatively coupled with each other via the chassis interconnect, wherein the plurality of blades shares the physical network interface, wherein the plurality of blades comprises a plurality of virtual machines, and wherein the plurality of virtual machines is associated with a plurality of virtual network interface cards (VNICs). The system further includes a network express manager configured to: implement a virtual network path using a virtual switching table associated with the plurality of VNICs, wherein the virtual network path comprises a first virtual wire between a first VNIC selected from the plurality of VNICs and a second VNIC selected from the plurality of VNICs, wherein the first VNIC is associated with a first virtual machine selected from the plurality of virtual machines and located in a first blade selected from the plurality of blades, wherein the second VNIC is associated with a second virtual machine selected from the plurality of virtual machines and located in a second blade selected from the plurality of blades, and wherein the second virtual machine is configured to migrate the second VNIC and the second virtual machine from the second blade to a third blade selected from the plurality of blades, place a first network packet and a second network packet in a receive buffer associated with the second VNIC, transmit the first network packet to the second VNIC in the second blade using the virtual switching table before the second VNIC and the second virtual machine are migrated, update the virtual switching table based on the second VNIC migrating, and transmit the second network packet to the second VNIC in the third blade using the virtual switching table after the second VNIC and the second virtual machine are migrated.

In general, in one aspect, the invention relates to a computer readable medium comprising a plurality of executable instructions for reconfiguring a virtual network path, wherein the plurality of executable instructions comprise instructions to: populate a virtual switching table associated with a plurality of virtual network interface cards (VNICs), wherein the plurality of VNICs is associated with a plurality of virtual machines, wherein the plurality of virtual machines is located in a plurality of blades communicatively coupled with each other via a chassis interconnect, and wherein the plurality of blades shares a physical network interface, implement the virtual network path using the virtual switching table, wherein the virtual network path further comprises a first virtual wire between the first VNIC selected from the plurality of VNICs and a second VNIC selected from the plurality of VNICs, wherein the first VNIC is associated with a first virtual machine selected from the plurality of virtual machines and located in a first blade selected from the plurality of blades, and wherein the second VNIC is associated with a second virtual machine selected from the plurality of virtual machines and located in a second blade selected from the plurality of blades, place a first network packet and a second network packet in a receive buffer associated with the second VNIC, transmit the first network packet to the second VNIC in the second blade using the virtual switching table, migrate the second VNIC and the second virtual machine from the second blade to a third blade selected from the plurality of blades, update the virtual switching table based on migrating the second VNIC, and transmit the second network packet to the second VNIC in the third blade using the virtual switching table, wherein instructions to transmit the first network packet are executed before migrating the second VNIC and the second virtual machine, and wherein instructions to transmit the second network packet are executed after migrating the second VNIC and the second virtual machine.

Other aspects of the invention will be apparent from the following description and the appended claims.

DETAILED DESCRIPTION

Figure 1:
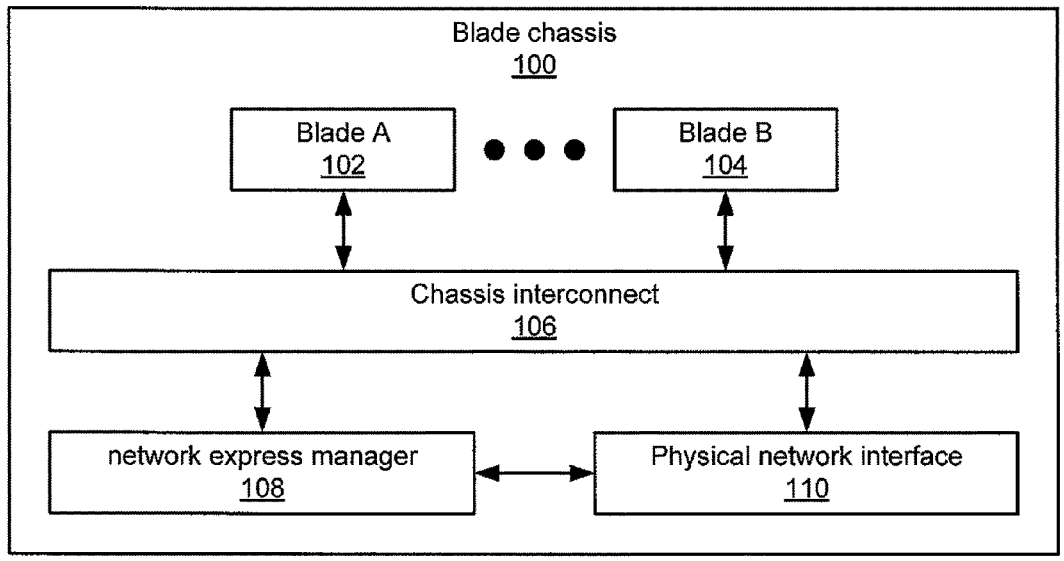
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for reconfiguring a virtual network path. The virtual network path is used to route network traffic to VNICs associated with virtual machines. The virtual machines are located in blades in a blade chassis, and the blades are communicatively coupled with each other via a chassis interconnect. The virtual network path includes one or more "virtual wires" for transmitting network traffic to and from the virtual machines via the chassis interconnect. The concept of a virtual wire is discussed in detail below. In this context, reconfiguring the virtual network path means migrating a virtual machine in the virtual network path from one blade to another, without dropping any network traffic destined for the virtual machine.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
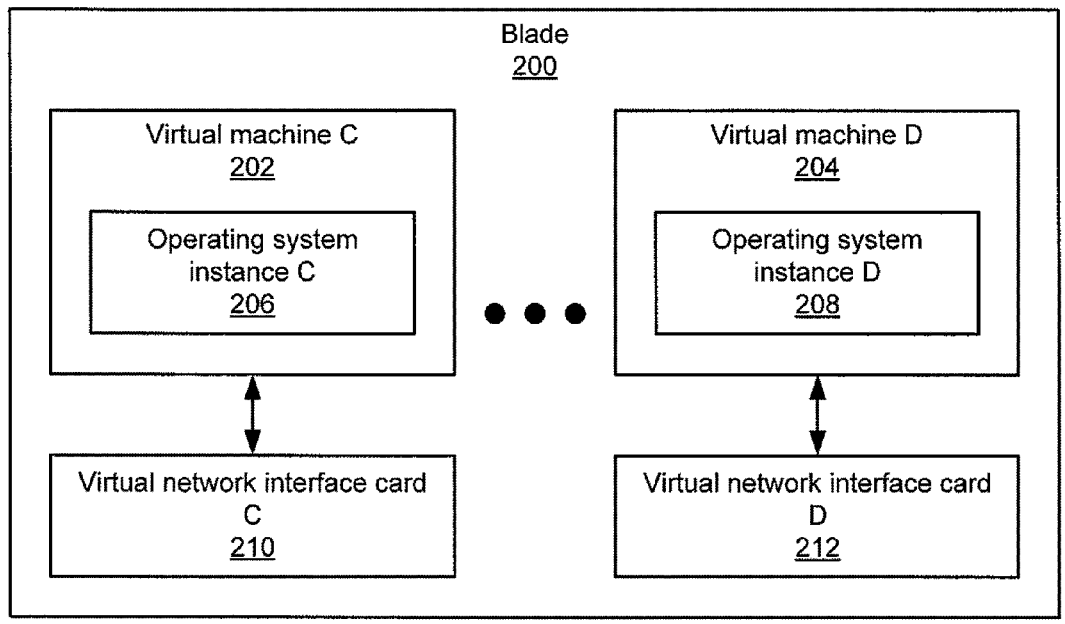
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments. For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety. VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

Figure 3:
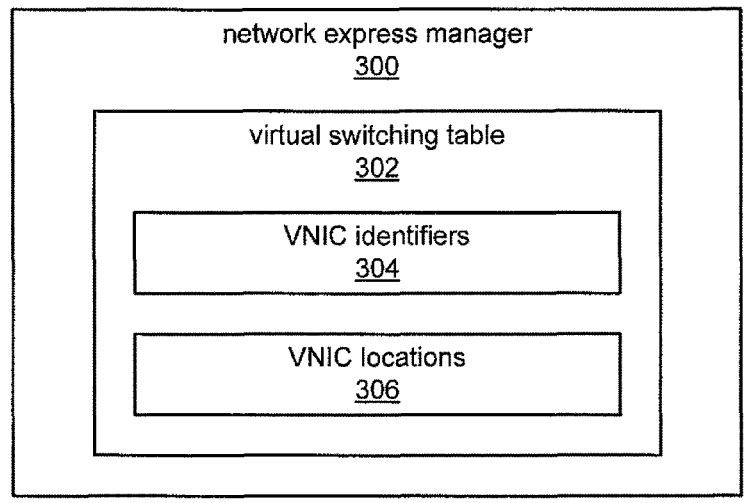
FIG. 3 shows a diagram of a network express manager in accordance with one or more embodiments of the invention.

As discussed above, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). Further, the network express manager (300) may be configured to route network traffic between different VNICs located in the blade chassis. In one or more embodiments of the invention, using the virtual switching table (302) in this manner facilitates the creation of a virtual network path, which includes virtual wires. Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
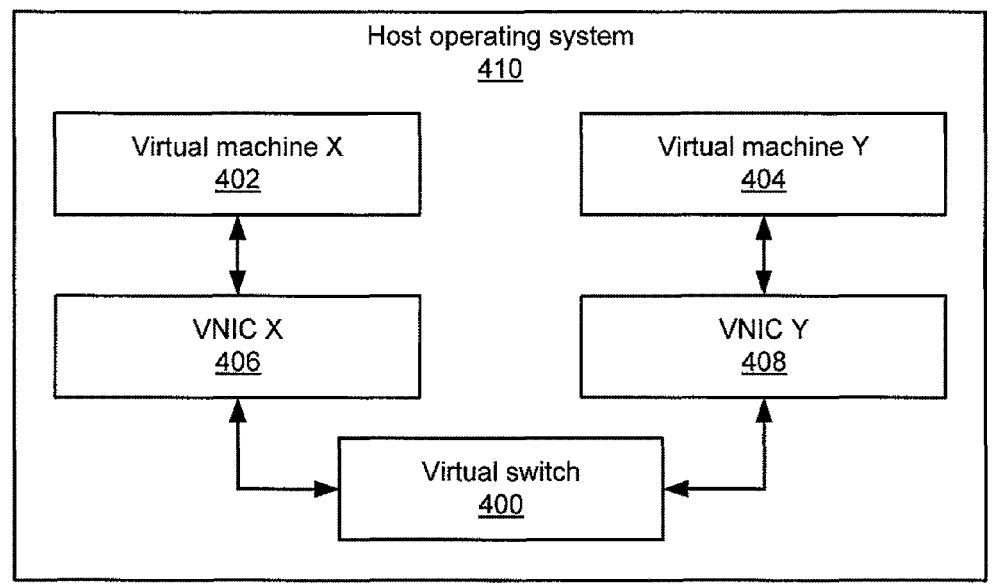
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host operating system (410) within which virtual machine X (402) and virtual machine Y (404) are located. Specifically, the host operating system (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
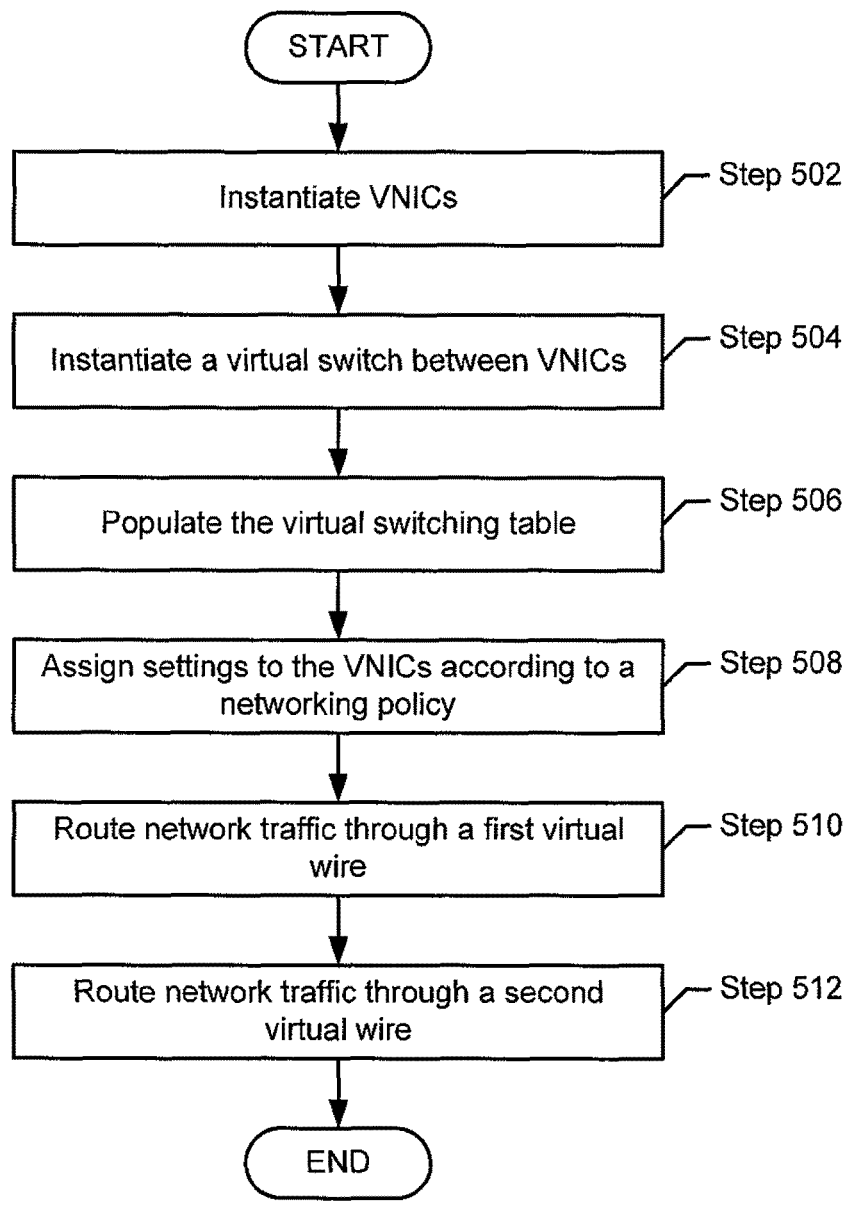
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host operating system, i.e., an operating system that is hosting the virtual machine associated with the VNIC. Registering the VNIC object establishes an interface between the host operating system's networking functionality and the abstraction layer provided by the VNIC. Thereafter, when the host operating system receives network traffic addressed to the VNIC, the host operating system forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480,261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, IP addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

Further, a combination of two or more virtual wires may be thought of as a "virtual network path." Specifically, transmitting network traffic over the virtual network path involves routing the network traffic through a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

Figure 6A:
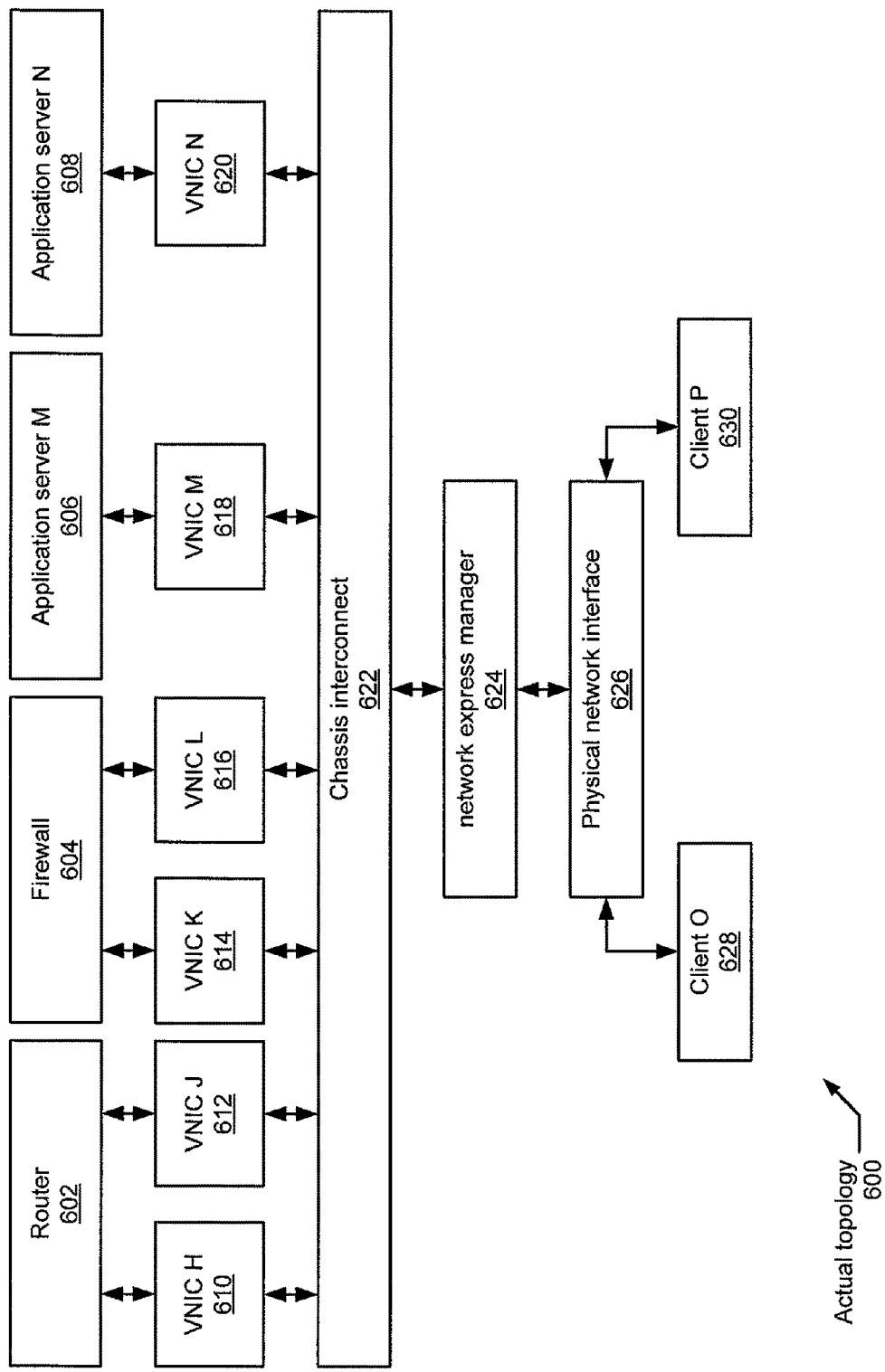
FIGS. 6A-6C show an example of creating virtual network paths in accordance with one or more embodiments of the invention.
Figure 6B:
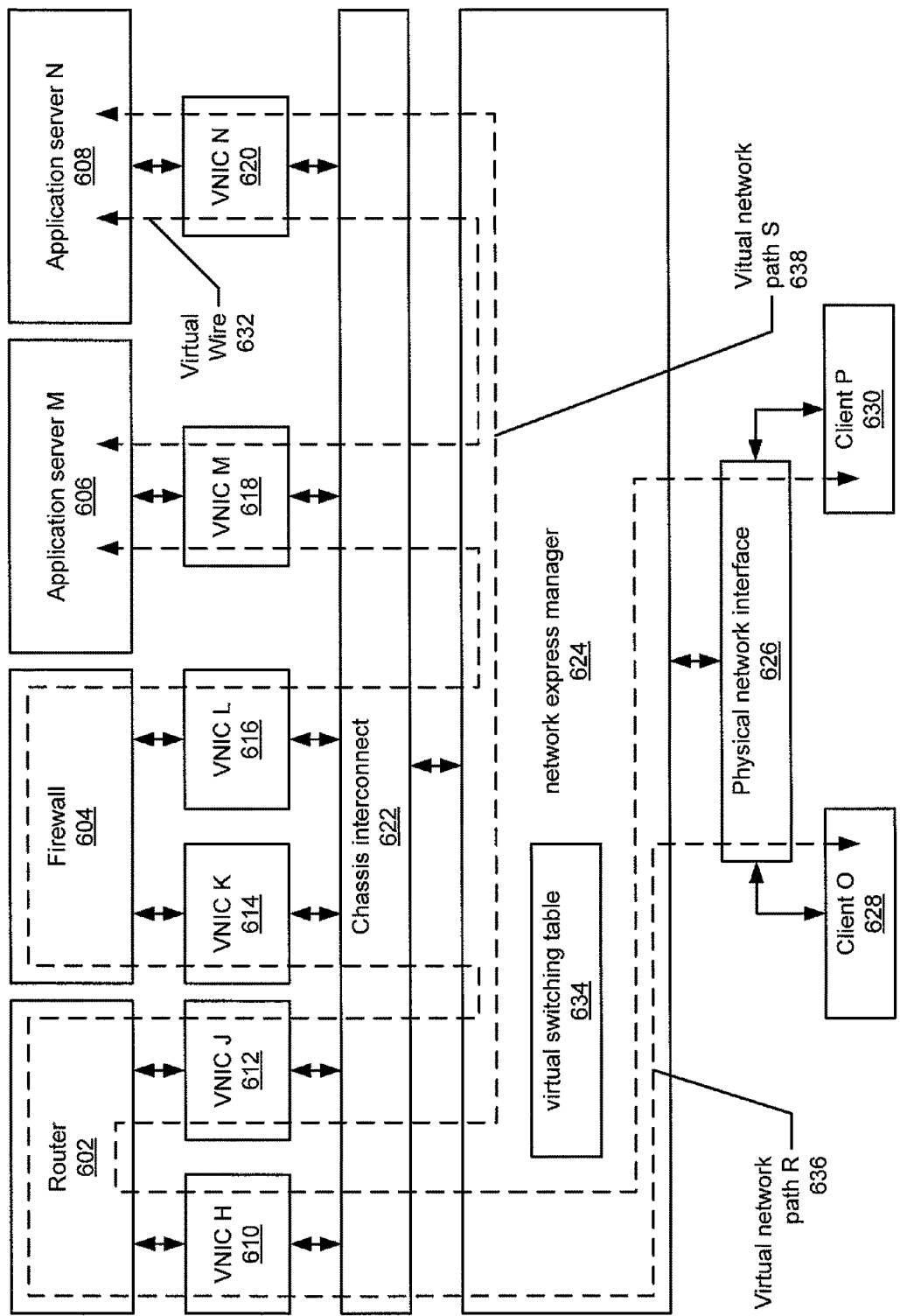
Figure 6C:
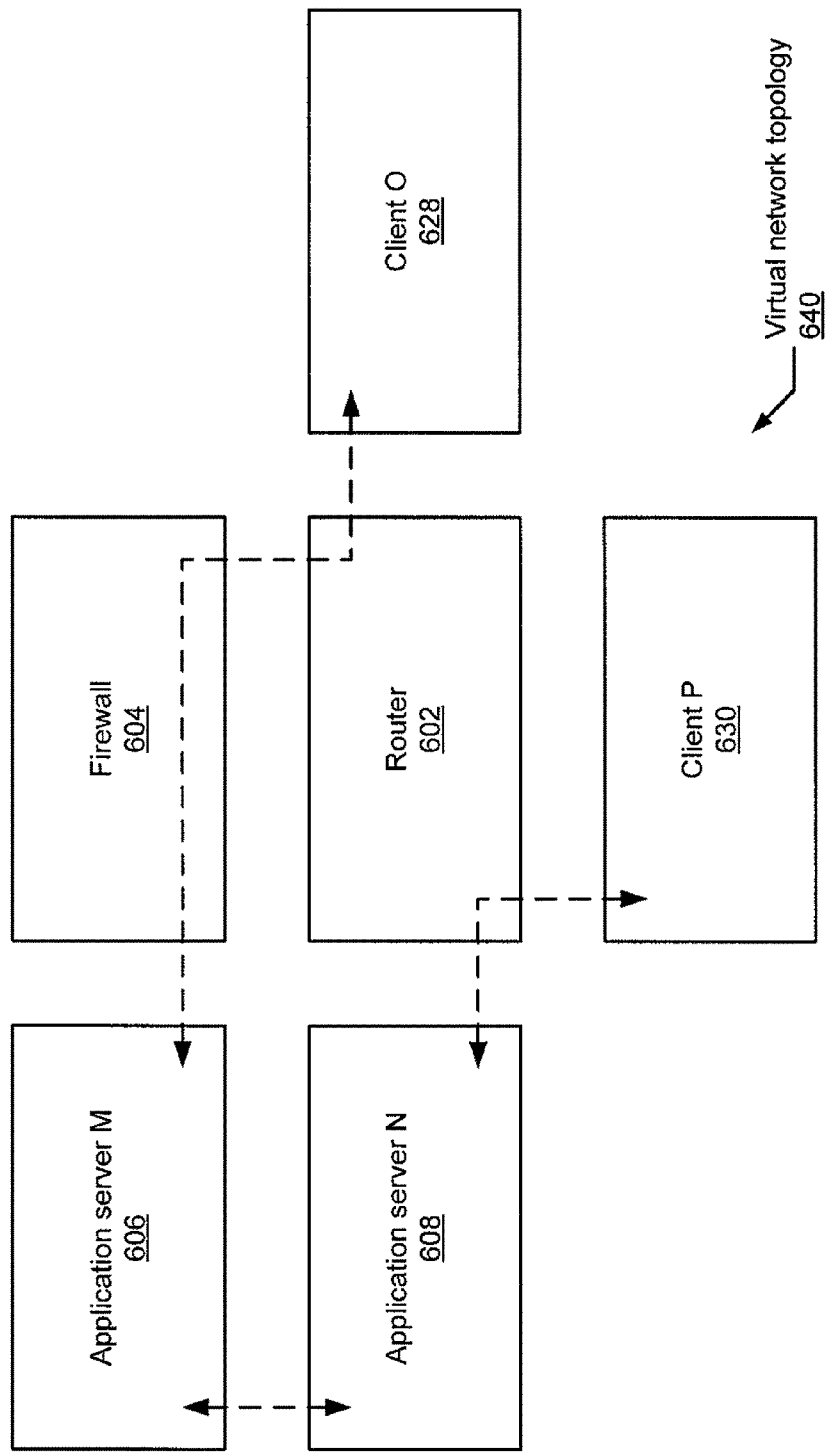

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). For ease of illustration, the blades themselves are not included in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630). In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be thought of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Figure 7:
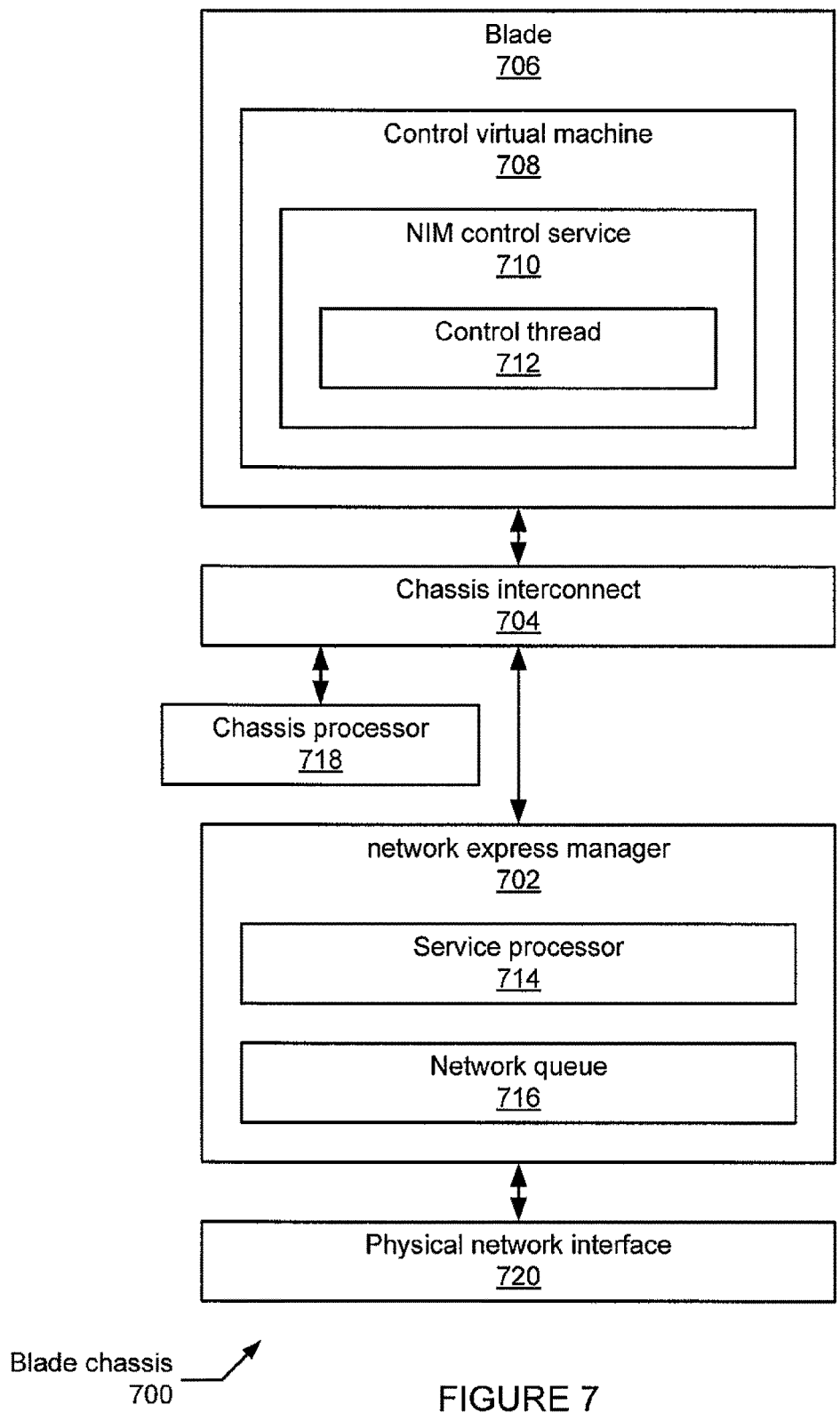
FIG. 7 shows a diagram of a blade chassis in accordance with one or more embodiments of the invention.

As noted above, the network express manager may be controlled by one of the virtual machines, referred to as a control virtual machine. FIG. 7 shows a diagram of a blade chassis (700) in accordance with one or more embodiments of the invention. The blade chassis (700) includes a chassis interconnect (704) communicatively coupled with a network express manager (702) and a blade (706). For ease of illustration, other blades communicatively coupled with the chassis interconnect (704) have been omitted from FIG. 7.

In one or more embodiments, in addition to the virtual switching table (300 in FIG. 3) (not shown in FIG. 7), the network express manager (702) includes a service processor (714) and a network queue (716). The network queue (716) is configured to store network traffic received from a network via a physical network interface (720), and network traffic received from blades via the chassis interconnect (704). The service processor (714) is configured to access network traffic pending in the network queue (716) and route the network traffic to the appropriate destination(s) via the appropriate VNICs located in blades in the blade chassis. In one or more embodiments of the invention, routing the network traffic involves classifying the network traffic by the service processor (714).

In one or more embodiments of the invention, the service processor (714) analyzes information in headers of the network traffic (i.e., network packet headers) to determine the destination of the network traffic. For example, the service processor (714) may extract an IP address from the header of a packet and use a classification policy to determine to which VNIC to send the packet. Once the VNIC is identified, the packet is placed in the appropriate receive buffer (not shown) in the network express manager (702). The network traffic is temporarily stored in the receive buffer until requested by (or sent to) the VNIC. A mechanism by which packets may be communicated to the VNIC is discussed above. The network express manager (702) uses the virtual switching table to communicate packets between the receive buffer and the VNIC.

In one or more embodiments of the invention, the service processor (714) may use any data (or combination of data) from or about the packet as the basis for the classification. Further, the classification policy may be any policy which defines how to place received packets in the appropriate receive buffers. For example, the classification policy may direct all network traffic for a specific subnet to a first receive buffer and all other network traffic to a second receive buffer.

Continuing with the discussion of FIG. 7, in one or more embodiments, the blade chassis (700) includes a chassis processor (718). The chassis processor (718) is located in the blade chassis (700) apart from the blades. In other words, the chassis processor (718) is "owned" by the blade chassis (700) and is not "owned" by any particular blade. In one or more embodiments, the chassis processor (718) is configured to perform various functions for the blade chassis (700).

Specifically, in one or more embodiments, the chassis processor (718) is configured to assign control of the network express manager (702) to a control virtual machine (708) located in the blade (706). In one or more embodiments, assigning control of the network express manager (702) to the control virtual machine (708) involves mapping the service processor (714) as a physical device in the control virtual machine (708).

In one or more embodiments, the service processor (714) is not visible to the control virtual machine (708) until the service processor (714) is mapped as a physical device to the control virtual machine (708). Further, after the service processor (714) is mapped to the control virtual machine (708), the service processor (714) is not visible to any of the other virtual machines executing on any blade in the blade chassis. Thus, while other blades (those that do not have control of the network express manager (702)) inherently use functionality of network express manager (702), the other blades do not have any control over the configuration of the network express manager (702). In one or more embodiments of the invention, only a single control virtual machine (708) is assigned control of the network express manager (702). Alternatively, multiple control virtual machines (not shown) may be used, for example for load balancing and/or redundancy purposes. In one or more embodiments of the invention, to ensure exclusive control of the network express manager (702), the chassis processor (718) is configured to exchange a security key (for example, a predetermined encryption key) with the control virtual machine (708). Any processes that do not have the appropriate security key are not granted access to control the network express manager (702).

In one or more embodiments of the invention, to control the network express manager (702), the control virtual machine (708) includes a network express manager control service (710) executing a control thread (712). The control thread (712) is configured to manage routing of network traffic by the service processor (714). For example, the control thread (712) may be configured to assign one or more classification policies to the service processor (714). Further, the control thread (712) may be used to populate and subsequently update a virtual switching table (not shown) in the network express manager (702).

In one or more embodiments of the invention, the control virtual machine (708) is configured to migrate to another blade (not shown). For example, the control virtual machine (708) may be configured to detect a fault in the blade (706), and migrate to another blade based on the fault. The migration may be based on many different types of faults, such as a bad hard drive sector, a dropped network packet, or a memory fault. In one or more embodiments of the invention, detecting the fault involves predicting that the fault is likely to occur. In other words, the fault may not have actually occurred when the control virtual machine (708) is migrated. However, based on software and/or hardware conditions in the blade where the control virtual machine (708) is located, the fault may be considered sufficiently likely to merit migrating the control virtual machine (708).

In one or more embodiments of the invention, the migration is performed to ensure that the control virtual machine (708) is able to continue controlling the network express manager (702), even if the blade (706) fails (i.e., experiences a "fatal" fault that would prevent the control virtual machine (708) from properly controlling the network express manager (702)). A method for migrating the control virtual machine (708) in accordance with one or more embodiments of the invention is discussed below. In one or more embodiments of the invention, policies for migrating the control virtual machine (708) are enforced by the chassis processor (718). For example, the chassis processor (718) may identify which fault(s) trigger a migration and/or to which blade to migrate the control virtual machine (708).

Figure 8:
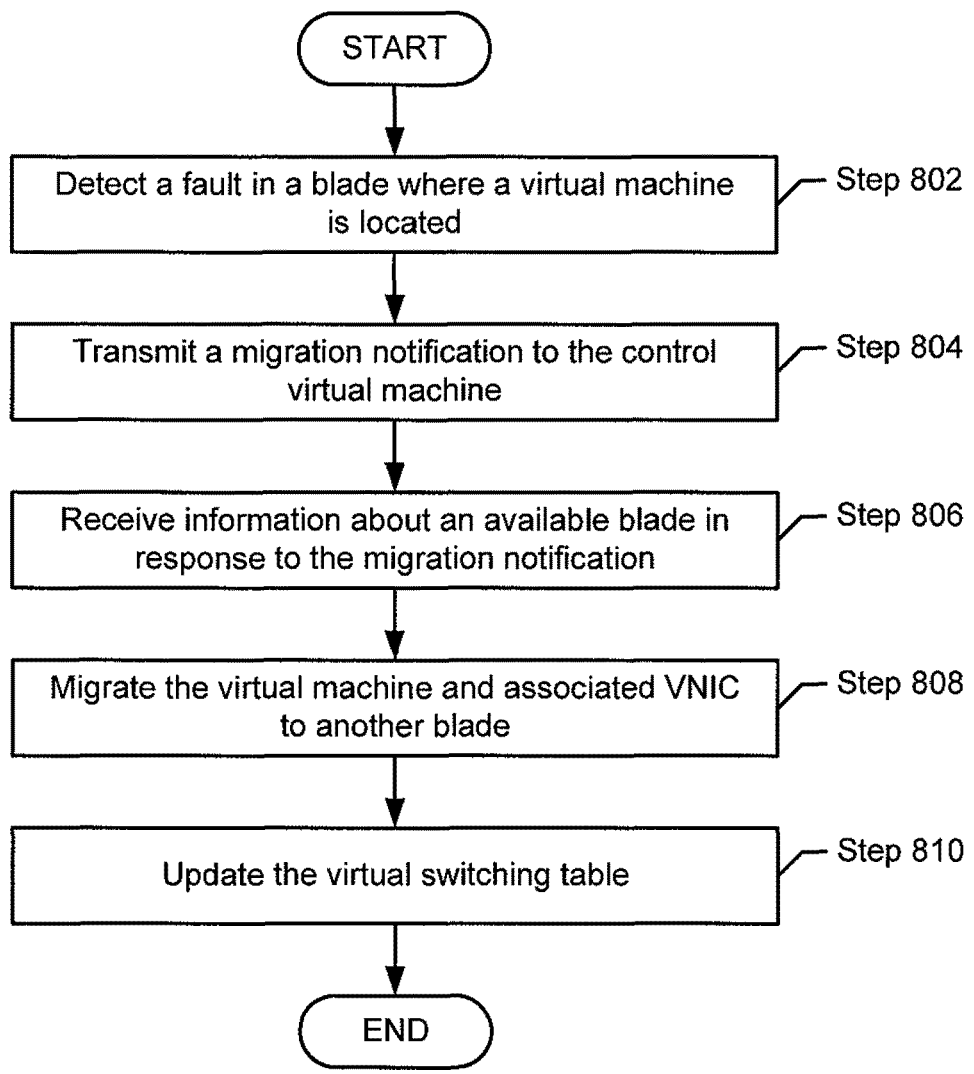
FIG. 8 shows a flowchart of a method for reconfiguring a virtual network path in accordance with one or more embodiments of the invention.

FIG. 8 shows a flowchart of a method for reconfiguring a virtual network path in accordance with one or more embodiments of the invention. In one or more embodiments of the invention, one or more of the steps shown in FIG. 8 may be omitted, repeated, and/or performed in a different order. Accordingly, embodiments of the invention should not be considered limited to the specific arrangement of steps shown in FIG. 8.

As noted above, reconfiguring the virtual network path involves migrating a virtual machine from one blade to another without dropping any network packets destined for the virtual machine. In one or more embodiments of the invention, the virtual machine is migrated when a fault is detected in the blade where the virtual machine is located (Step 802). As with the control virtual machine, the migration may be based on many different types of faults, such as a bad hard drive sector, a dropped network packet, or a memory fault. In one or more embodiments of the invention, the migration is performed to ensure that the virtual machine is able to continue executing even if the blade (i.e., the blade where the virtual machine is initially located) experiences a fatal fault (i.e., a fault that would prevent the virtual machine from executing properly).

In one or more embodiments of the invention, in Step 804, the virtual machine transmits a migration notification to a control virtual machine. The concept of a control virtual machine is discussed in detail above. In one or more embodiments of the invention, the migration notification prompts the control virtual machine to determine where to migrate the virtual machine, based on a migration policy. For example, the migration policy may include criteria for load balancing the blades in the blade chassis. In one or more embodiments of the invention, the migration notification also prompts the control virtual machine to update the virtual switching table, as discussed below.

In one or more embodiments of the invention, in Step 806, the virtual machine receives information about an available blade, in response to the migration notification. In Step 808, the virtual machine and the VNIC(s) associated with the virtual machine are migrated to the available blade. In one or more embodiments of the invention, migrating the virtual machine involves checkpointing processes executing in the virtual machine, transferring the virtual machine to the new blade, then resuming the processes. Checkpointing the processes helps ensure that the migration does not result in any lost data within the virtual machine.

In one or more embodiments of the invention, in Step 810, the virtual switching table is updated to reflect the new location of the VNIC(s) associated with the virtual machine, i.e., the locations of the VNIC(s) after the migration. For example, if the blade chassis is a PCI-E backplane, updating the virtual switching table may involve modifying PCI-E endpoints associated with the VNIC(s). Once the virtual machine and VNIC(s) have been migrated and the virtual switching table has been updated, the virtual machine may resume executing as before. In particular, the virtual machine may resume processing network traffic received from the network express manager. Thus, the virtual network path that includes the virtual machine is successfully reconfigured without dropping any network packets destined for the virtual machine.

In one or more embodiments of the invention, if the virtual machine is migrated to a blade where another virtual machine in the virtual network path is also located, and the two virtual machines are configured to communicate with each other, then a virtual switch may be instantiated between the VNICs associated with the two virtual machines, to avoid unnecessary use of the chassis interconnect.

FIGS. 9A-9D show an example of migrating a virtual machine in accordance with one or more embodiments of the invention. FIGS. 9A-9D are provided for exemplary purposes only, and should not be construed as limiting the scope of the invention.

Figure 9A:
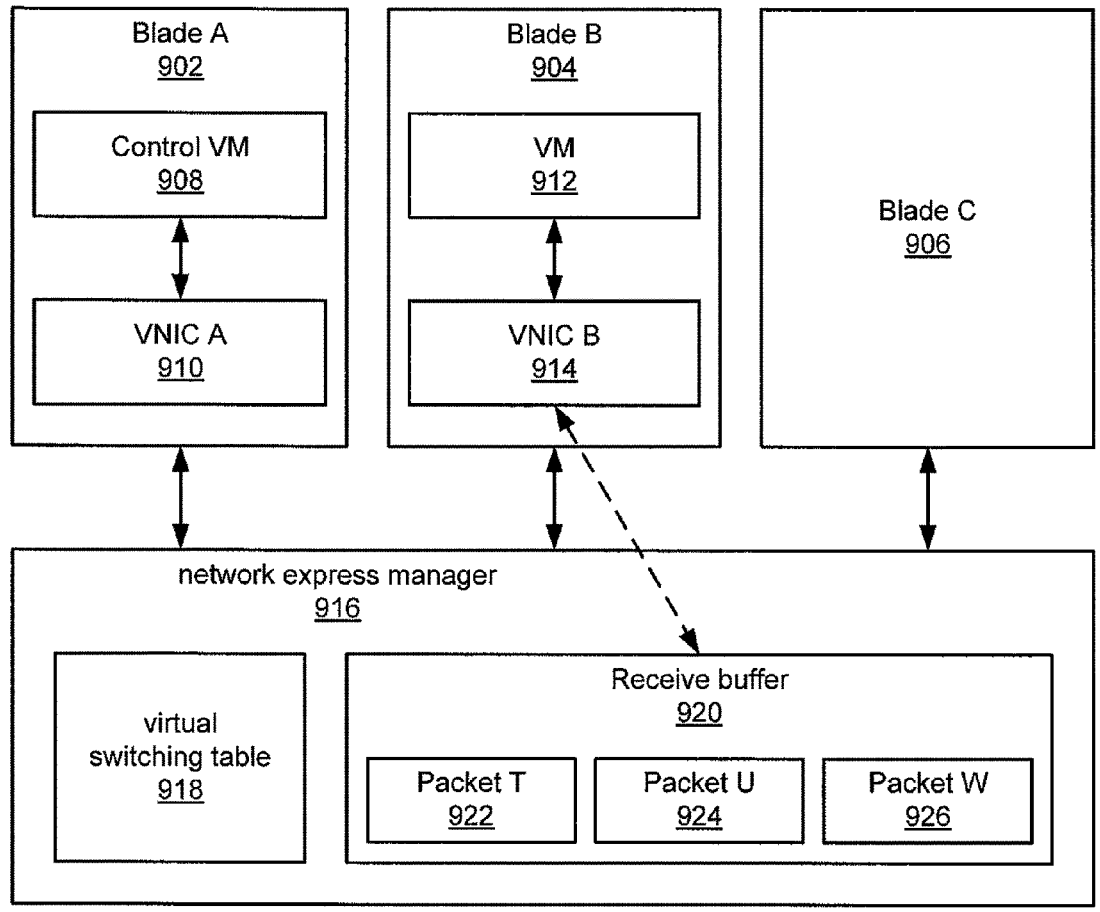
FIGS. 9A-9D show an example of reconfiguring a virtual network path in accordance with one or more embodiments of the invention.

Starting with discussion of FIG. 9A, blade A (902), blade B (904), and blade C (906) are communicatively coupled with each other and a network express manager (916) via a chassis interconnect (not shown). Blade A (902) includes a control virtual machine (908), which is configured to communicate with the network express manager (916) via VNIC A (910). As discussed above, the control virtual machine (908) may include a mapping of a service processor (not shown) located in the network express manager (916) as a physical device in the control virtual machine (908).

Blade B (904) also includes a virtual machine (912), which does not have control of the network express manager (916). The virtual machine (912) is configured to send and receive network traffic via VNIC B (914). In this example, blade C (906) does not initially include any virtual machines. However, in one or more embodiments of the invention, blade C (906) may include any number of virtual machines and associated VNICs.

The network express manager (916) is configured to route network traffic to and from blade A (902), blade B (904), blade C (906), and a physical network interface (not shown). Specifically, the network express manager (916) includes a virtual switching table (918) indicating the locations of the VNICs (e.g., VNIC A (910), VNIC B (914)) in the blades. Further, the network express manager (916) includes a receive buffer (920), which is configured to store network packets (e.g., packet T (922), packet U (924), packet W (926)) destined for the VNICs. In one or more embodiments of the invention, the network express manager (916) includes multiple receive buffers, and each receive buffer is associated with a particular VNIC. For example, as indicated by a dashed line in FIG. 9A, the receive buffer (920) is associated with VNIC B (914). To route network packets to VNIC B (914), the network express manager (916) stores the network packets in the receive buffer (920), and VNIC B (914) obtains the network packets from the receive buffer (920) using either a "push" mechanism or a "pull" mechanism. In one or more embodiments of the invention, network packets are placed in the appropriate receive buffers by a service processor (not shown) according to a classification policy.

Figure 9B:
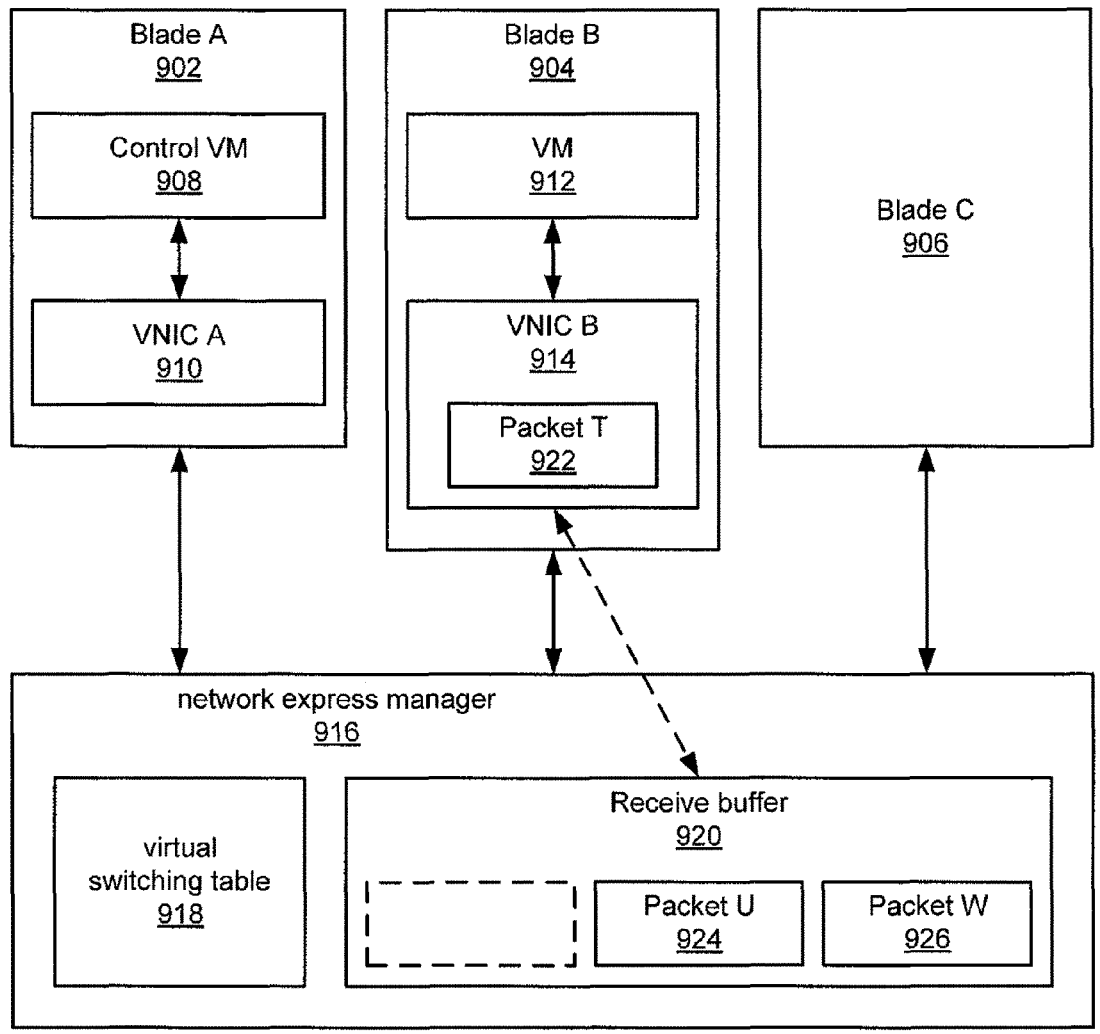

For example, FIG. 9B shows the result of transmitting packet T (922) to VNIC B (914). Packet T has been removed from the receive buffer (920), but packet U (924) and packet W (926) have not yet been received by VNIC B (914), and therefore remain in the receive buffer (920).

In one or more embodiments of the invention, while packet U (924) and packet W (926) still remain in the receive buffer (920), the virtual machine (912) and VNIC B (914) are migrated to blade C (906). In one or more embodiments of the invention, the virtual machine (912) transmits a migration notification to the control virtual machine (908). The control virtual machine (908) selects blade C (906) as a target for the migration, and also transmits a message to the network express manager (916) to modify the virtual switching table (918) accordingly. The control virtual machine (908) informs the virtual machine (912) that blade C (906) is available, and the virtual machine (912) and VNIC B (914) are then migrated to blade C (906).

Figure 9C:
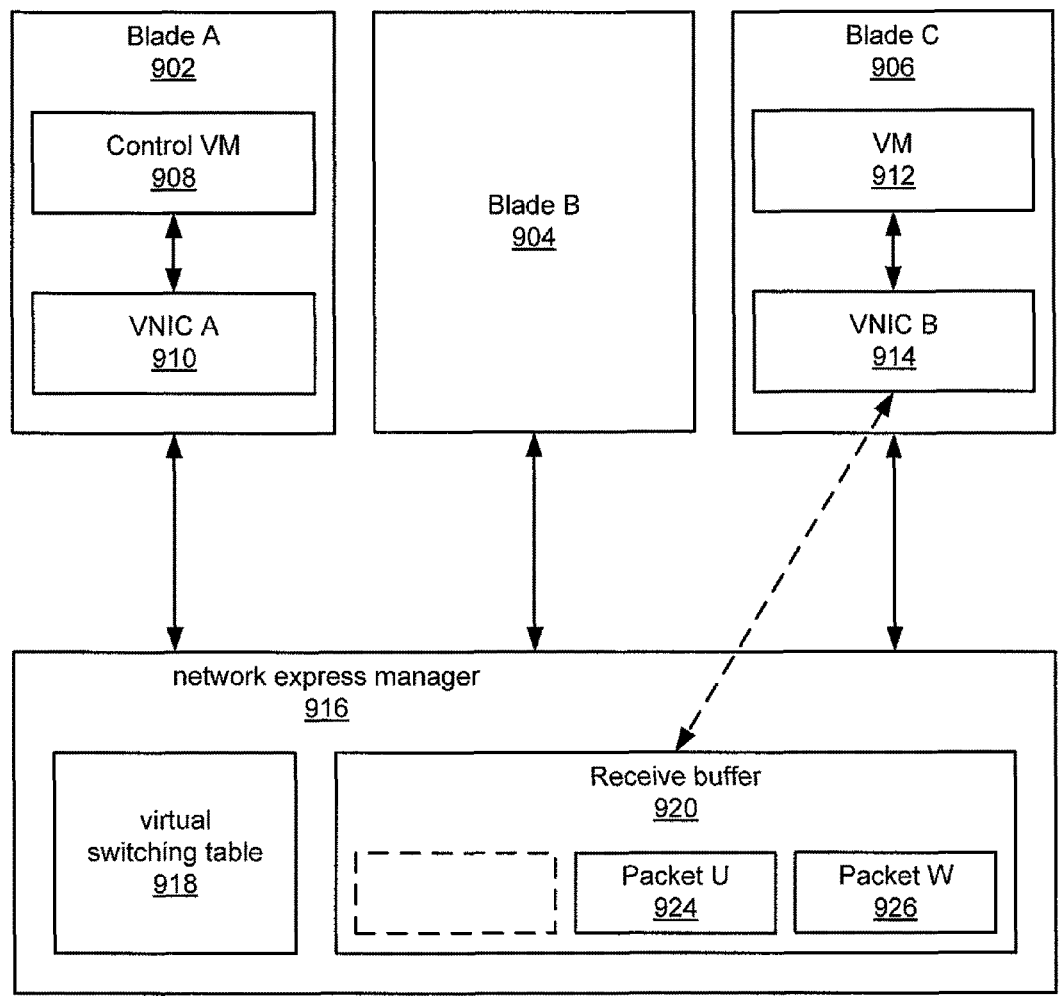

FIG. 9C shows the result of migrating the virtual machine (912) and VNIC B (914) to blade C (906). VNIC B (914) now has a new location, but continues to be associated with the receive buffer (920), as indicated by a dashed line. At this point, the virtual machine (912) may resume processing at the point where processing was stopped before the migration.

Figure 9D:
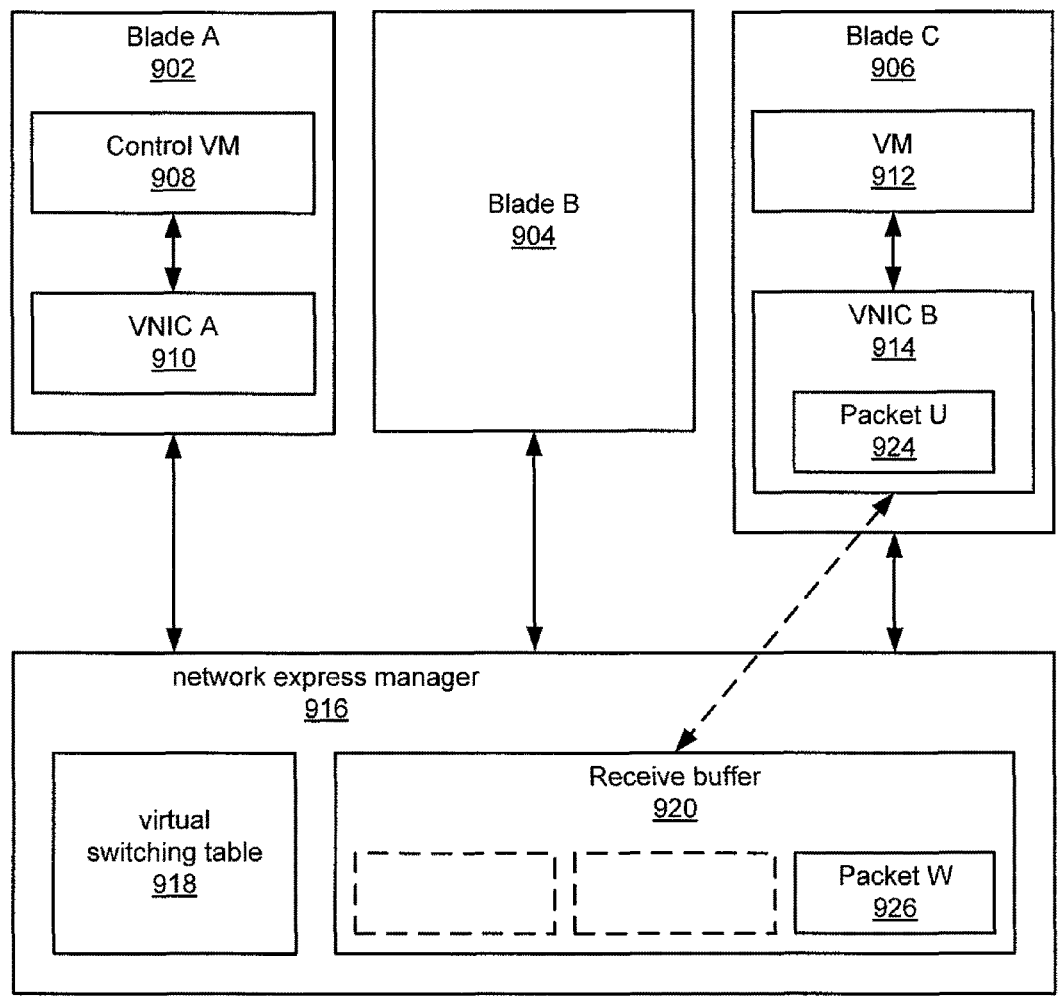

In particular, the virtual machine (912) may continue to receive network packets via VNIC B (914). FIG. 9D shows the situation where packet U (924) has been transmitted from the receive buffer (920) to VNIC B (924). Because the receive buffer (920) was not modified during the migration, no network packets were dropped as a result of the migration. Thus, the virtual network path including the virtual machine (912) was successfully reconfigured by migrating the virtual machine (912).

Embodiments of the invention allow for a virtual network path to be reconfigured by migrating a virtual machine, and associated VNIC(s), in the virtual network path. In particular, the virtual machine may be migrated without dropping network packets destined for the virtual machine, thereby ensuring that network traffic is not lost or misrouted as a result of the migration.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for reconfiguring a virtual network path, comprising:
  populating a virtual switching table associated with a plurality of virtual network interface cards (VNICs),
    wherein the plurality of VNICs is associated with a plurality of virtual machines,
    wherein the plurality of virtual machines is located in a plurality of computers communicatively coupled with each other via a chassis interconnect, and
    wherein the plurality of computers shares a physical network interface;
  implementing the virtual network path using the virtual switching table,
    wherein the virtual network path comprises a first virtual wire between a first VNIC selected from the plurality of VNICs and a second VNIC selected from the plurality of VNICs,
    wherein the first VNIC is associated with a first virtual machine selected from the plurality of virtual machines and located in a first computer selected from the plurality of computers, and wherein the second VNIC is associated with a second virtual machine selected from the plurality of virtual machines and located in a second computer selected from the plurality of computers;

placing a first network packet and a second network packet in a receive buffer associated with the second VNIC;

transmitting the first network packet to the second VNIC in the second computer using the virtual switching table;

migrating the second VNIC and the second virtual machine from the second computer to a third computer selected from the plurality of computers;

updating the virtual switching table based on migrating the second VNIC; and transmitting the second network packet to the second VNIC in the third computer using the virtual switching table, wherein transmitting the first network packet is performed before migrating the second VNIC and the second virtual machine, and wherein transmitting the second network packet is performed after migrating the second VNIC and the second virtual machine.

2. The method of claim 1, further comprising:
transmitting, by the second virtual machine, a migration notification to a control virtual machine selected from the plurality of virtual machines, wherein the control virtual machine is responsible for updating the virtual switching table in response to the migration notification.

3. The method of claim 1, further comprising:
instantiating a virtual switch between the second VNIC and a third VNIC selected from the plurality of VNICs, wherein the third VNIC is located in the third computer, wherein instantiating the virtual switch is performed in response to migrating the second VNIC, and wherein the virtual switch allows communication between the second VNIC and the third VNIC independent of the chassis interconnect.

4. The method of claim 1, further comprising:
detecting a fault in the second computer, wherein migrating the second VNIC and the second virtual machine to the third computer is performed based on the fault.

5. The method of claim 1, wherein the first network packet and the second network packet are both received by the network express manager before migrating the second VNIC and the second virtual machine.

6. The method of claim 1, wherein the chassis interconnect comprises a Peripheral Component Interface Express (PCI-E) backplane, and wherein the virtual switching table comprises a mapping of the plurality of virtual NICs to a plurality of PCI-E endpoints on the PCI-E backplane.

7. The method of claim 1, wherein each the plurality of computers is a blade.

8. A system comprising:
a chassis interconnect;
a physical network interface;
a plurality of blades communicatively coupled with each other via the chassis interconnect,
wherein the plurality of blades shares the physical network interface,
wherein the plurality of blades comprises a plurality of virtual machines, and
wherein the plurality of virtual machines is associated with a plurality of virtual network interface cards (VNICs); and a network express manager configured to:
implement a virtual network path using a virtual switching table associated with the plurality of VNICs,
wherein the virtual network path comprises a first virtual wire between a first VNIC selected from the plurality of VNICs and a second VNIC selected from the plurality of VNICs,
wherein the first VNIC is associated with a first virtual machine selected from the plurality of virtual machines and located in a first blade selected from the plurality of blades,
wherein the second VNIC is associated with a second virtual machine selected from the plurality of virtual machines and located in a second blade selected from the plurality of blades, and
wherein the second virtual machine is configured to migrate the second VNIC and the second virtual machine from the second blade to a third blade selected from the plurality of blades, place a first network packet and a second network packet in a receive buffer associated with the second VNIC;

transmit the first network packet to the second VNIC in the second blade using the virtual switching table before the second VNIC and the second virtual machine are migrated;

update the virtual switching table based on the second VNIC migrating, and transmit the second network packet to the second VNIC in the third blade using the virtual switching table after the second VNIC and the second virtual machine are migrated.

9. The system of claim 8, wherein the network express manager is configured to place the first network packet and the second network packet in the receive buffer according to a classification policy.

10. The system of claim 8, wherein the second virtual machine is further configured to:
transmit a migration notification to a control virtual machine selected from the plurality of virtual machines,
wherein the control virtual machine is responsible for updating the virtual switching table in response to the migration notification.

11. The system of claim 8, wherein the second virtual machine is further configured to:
detect a fault in the second blade, wherein the second virtual machine is configured to migrate the second VNIC and the second virtual machine to the third blade based on the fault.

12. The system of claim 8, wherein the first network packet and the second network packet are both received by the network express manager before the second VNIC and the second virtual machine are migrated.

13. The system of claim 8, wherein the chassis interconnect comprises a Peripheral Component Interface Express (PCI-E) backplane, and wherein the virtual switching table comprises a mapping of the plurality of virtual NICs to a plurality of PCI-E endpoints on the PCI-E backplane.

14. A computer readable medium comprising a plurality of executable instructions stored on the computer readable medium for reconfiguring a virtual network path, wherein the plurality of executable instructions, when executed by a processor, perform a method, the method comprising:
populating a virtual switching table associated with a plurality of virtual network interface cards (VNICs),
wherein the plurality of VNICs is associated with a plurality of virtual machines, wherein the plurality of virtual machines is located in a plurality of blades communicatively coupled with each other via a chassis interconnect, and wherein the plurality of blades shares a physical network interface;

implementing the virtual network path using the virtual switching table, wherein the virtual network path further comprises a first virtual wire between the first VNIC selected from the plurality of VNICs and a second VNIC selected from the plurality of VNICs, wherein the first VNIC is associated with a first virtual machine selected from the plurality of virtual machines and located in a first blade selected from the plurality of blades, and wherein the second VNIC is associated with a second virtual machine selected from the plurality of virtual machines and located in a second blade selected from the plurality of blades;

placing a first network packet and a second network packet in a receive buffer associated with the second VNIC;

transmitting the first network packet to the second VNIC in the second blade using the virtual switching table;

migrating the second VNIC and the second virtual machine from the second blade to a third blade selected from the plurality of blades;

updating the virtual switching table based on migrating the second VNIC; and transmitting the second network packet to the second VNIC in the third blade using the virtual switching table, wherein instructions to transmit the first network packet are executed before migrating the second VNIC and the second virtual machine, and wherein instructions to transmit the second network packet are executed after migrating the second VNIC and the second virtual machine.

15. The computer readable medium of claim 14, wherein placing the first network packet and the second network packet in the receive buffer comprises using a classification policy.

16. The computer readable medium of claim 14, wherein the method further comprises:

transmitting, by the second virtual machine, a migration notification to a control virtual machine selected from the plurality of virtual machines, wherein the control virtual machine is responsible for updating the virtual switching table in response to the migration notification.

17. The computer readable medium of claim 14, wherein the method further comprises:

instantiating a virtual switch between the second VNIC and a third VNIC selected from the plurality of VNICs, wherein the third VNIC is located in the third blade, wherein the virtual switch is instantiated in response to migrating the second VNIC, and wherein the virtual switch allows communication between the second VNIC and the third VNIC independent of the chassis interconnect.

18. The computer readable medium of claim 14, wherein the method further comprises:

detect a fault in the second blade, wherein instructions to migrate the second VNIC and the second virtual machine to the third blade are executed based on the fault.

19. The computer readable medium of claim 14, wherein the first network packet and the second network packet are both received by the network express manager before migrating the second VNIC and the second virtual machine.

20. The computer readable medium of claim 14, wherein the chassis interconnect comprises a Peripheral Component Interface Express (PCI-E) backplane, and wherein the virtual switching table comprises a mapping of the plurality of virtual NICs to a plurality of PCI-E endpoints on the PCI-E backplane.

* * * * *